No. 748,255. PATENTED DEC. 29, 1903.
W. E. BERRY.
KITCHEN UTENSIL.
APPLICATION FILED DEC. 18, 1902.
NO MODEL.
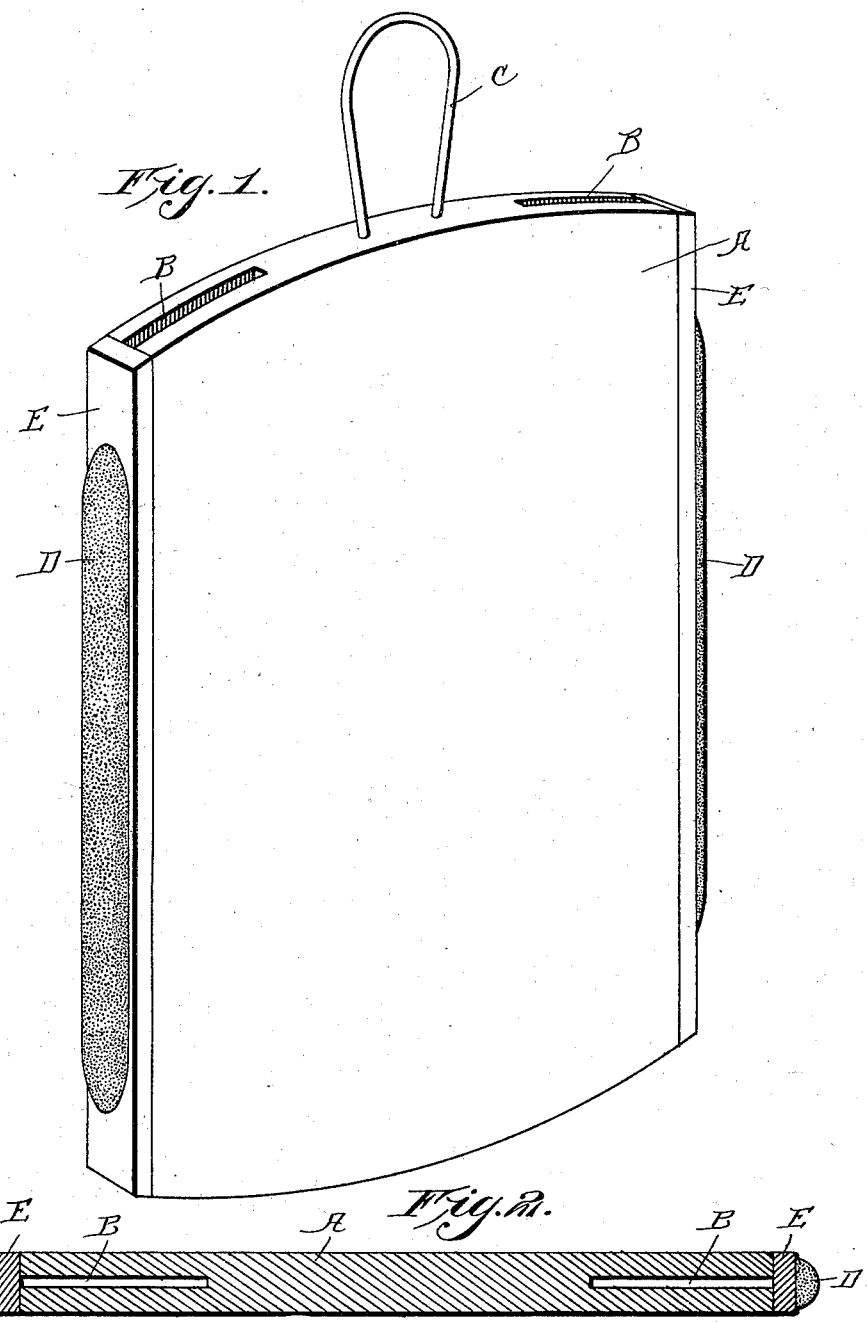

No. 748,255. Patented December 29, 1903.

UNITED STATES PATENT OFFICE.

WILLIAM E. BERRY, OF BRYN MAWR, PENNSYLVANIA.

KITCHEN UTENSIL.

SPECIFICATION forming part of Letters Patent No. 748,255, dated December 29, 1903.

Application filed December 18, 1902. Serial No. 135,679. (No model.)

*To all whom it may concern:*

Be it known that I, WILLIAM E. BERRY, a citizen of the United States, residing at Bryn Mawr, county of Montgomery, and State of Pennsylvania, have invented a certain new and useful Improvement in Kitchen Utensils, of which the following is a specification.

My invention relates to a new and useful improvement in kitchen utensils, and has for its object to provide a kitchen utensil which consists of a board upon which bread and meat may be cut, and which is so constructed as to form a holder for bread and meat knives and also provided upon each side with a substance upon which the knives may be sharpened.

With these ends in view this invention consists in the details of construction and combination of elements hereinafter set forth and then specifically designated by the claim.

In order that those skilled in the art to which this invention appertains may understand how to make and use the same, the construction and operation will now be described in detail, referring to the accompanying drawings, forming a part of this specification, in which—

Figure 1 is a perspective view of my invention complete; Fig. 2, a cross-section through the same.

A represents a flat board having a plain surface upon each side upon which meat and bread may be sliced. This board is provided upon each side with openings B, formed longitudinally therethrough, in which the blades of the bread and meat knives may be inserted when the board is hung up by the loop C. Upon each side of the board is secured a strip of a composition of emery or other suitable material for sharpening knives, as indicated at D. This strip of emery is preferably made half-round in cross-section and the flat surface glued or otherwise secured to the edges of the board. Thus the knives may be sharpened at any time by rubbing them upon the emery upon either side of the board.

The board can be constructed in any manner desired; but preferably the cheapest mode of forming the board will be to cut a longitudinal slot in each edge of the board and then secure a strip of wood E upon the edge of the board, so as to cover the slot, and thus form the openings B. The emery D would then be secured to strips E.

The advantage of my invention is that I combine in one article a meat and bread board, a knife-holder, and a knife-sharpener, and at the same time the article may be manufactured so as to be sold at a comparatively small price.

Of course I do not wish to be limited to the exact construction here shown, as slight modifications could be made without departing from the spirit of my invention.

Having thus fully described my invention, what I claim as new and useful is—

In a device of the character noted a cutting-board having slots in its edges extending from end to end, strips secured to the edges inclosing the slots and an abrading substance semicircular in cross-section secured to the outer surfaces of the strips.

In testimony whereof I have hereunto affixed my signature in the presence of two subscribing witnesses.

WILLIAM E. BERRY.

Witnesses:
E. W. MILLER,
H. V. YERKES.